Aug. 29, 1944. K. F. NYSTROM 2,357,020
CAR TRUCK SIDE FRAMES
Filed Oct. 12, 1942 2 Sheets-Sheet 1
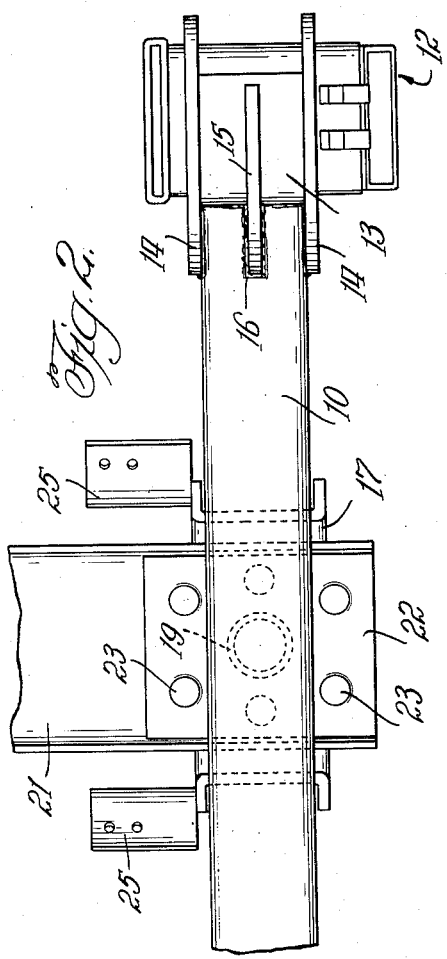
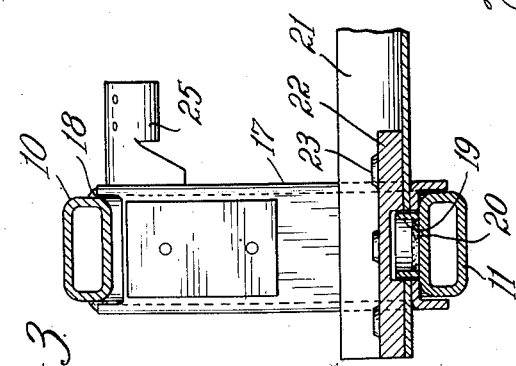
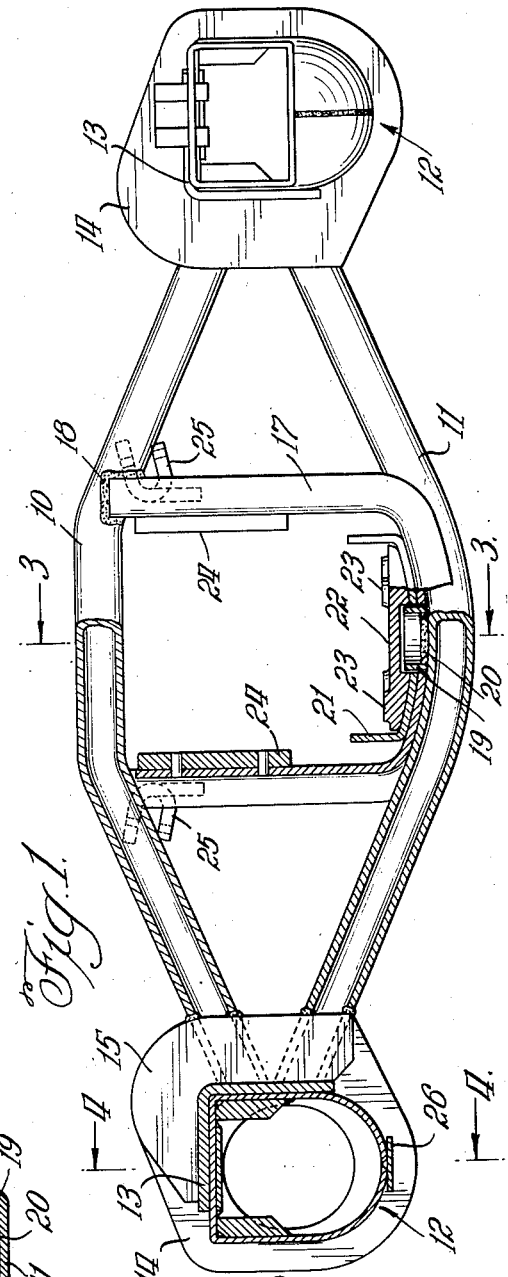
Inventor:
Karl F. Nystrom,
By George Heidman
Atty.

Aug. 29, 1944.   K. F. NYSTROM   2,357,020
CAR TRUCK SIDE FRAMES
Filed Oct. 12, 1942   2 Sheets-Sheet 2

Inventor:
Karl F. Nystrom
By George Heidman
Atty.

Patented Aug. 29, 1944

2,357,020

UNITED STATES PATENT OFFICE 2,357,020

CAR TRUCK SIDE FRAME

Karl F. Nystrom, Milwaukee, Wis.

Application October 12, 1942, Serial No. 461,810

8 Claims. (Cl. 105—206)

My invention relates to truck side frames, more especially intended for railroad freight car trucks, which involve top chords and bottom chords, wherein the tension will substantially equal the compression with both chords adapted to carry substantially equal portions of the load.

The invention contemplates a side frame with a bottom chord provided with a catenary curve or curvature which approximates the deflection curve approached by the member under a load and wherein the load transmitting elements of the truck between the chords have floating relation with the bottom chord, tending to check longitudinal vibration of the two side frames and eliminating secondary stresses.

The invention more specifically stated contemplates a truck side frame, whether of cast metal or of built-up construction, with a bottom chord formed as stated and involving a substantially U-shape stirrup whose ends are intimately connected with the top chord of the frame while the curved bottom portion of the stirrup (having a curvature similar to that of the bottom chord) has loose bearing relation with the bottom chord and floatingly supports a similarly curved spring plank with means for restricting longitudinal movement of the spring plank which in turn preferably is provided with an independent loosely held spring seat.

The invention in its specific embodiment presents a built-up truck side frame composed of a top chord and a bottom chord, preferably of steel tubing or tubular cross-section, whose ends are welded or intimately connected with the journal boxes at each end of the frame through the medium of load distributing members which afford large welding surfaces and are disposed about the tops and sides of the journal boxes.

The invention also has for its object the provision of a car truck side frame which involves less metal and less weight than is the case with truck side frames as heretofore constructed, while at the same time possessing the required strength.

The objects and advantages of my invention will all be readily comprehended from the following detailed description of the accompanying drawings wherein—

Figure 1 is a side elevation of my improved truck side frame with portions broken away and shown in section.

Figure 2 is a top plan view of one end of the side frame.

Figure 3 is a vertical sectional view taken substantially on the line 3—3 of Figure 1, as viewed by the arrows.

Figure 4:
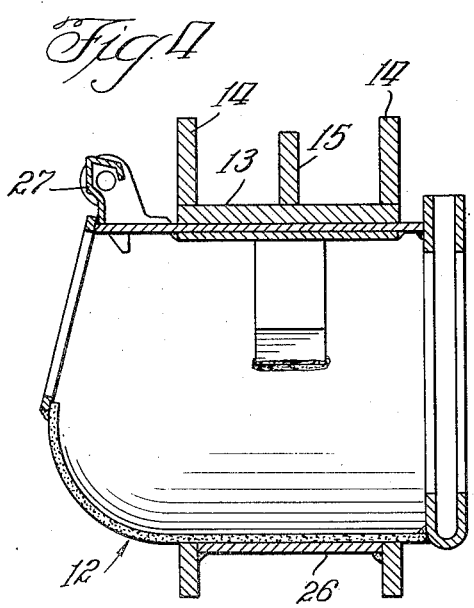
Figure 4 is a vertical sectional view taken on the line 4—4 of Figure 1 looking in the direction of the arrows.

My improved car truck side frame as exemplified in the first four figures comprises a truss composed of a top chord 10 and a bottom chord 11 of steel tubing of oblong or other suitable cross-sectional configuration, whose ends are brought into juxtaposition and intimately connected with the journal boxes 12 at each end of the side frame through the medium of load distributing plates 13 which are formed to fit onto the tops of the journal boxes and against the sides thereof as shown in Figure 1. The plates 13 are preferably provided with spaced apart vertically disposed gussets 14, 14 at opposite sides and with an intermediate gusset 15. The gussets 14 preferably are made to extend about the journal boxes as shown, while the intermediate gussets 15 merely extend from the tops and one of the sides of the load distributing plates 13 as shown at the left in Figure 1 and at the right in Figure 2.

The ends of the chords 10 and 11—which are coextensive with the width between the side gussets 14, 14—are slotted as shown at 16 (see Figure 2) to receive the intermediate gussets 15; the ends of the chords being intended to be in close relation or contact with the gussets 14 and 15 which afford greater attaching surface between the chords and the load distributing plates; the ends of the chords being welded to the load distributing plates 13 and the gussets 14, 15.

In the exemplification of Figure 1, the outside gussets 14, 14 are formed to extend about the journal boxes 12 and the load distributing plates or members 13 and the gussets 14 are welded to the journal boxes 12, providing rigid bearings at the ends of the truss.

The side frame intermediate the arched portion of the top chord and the catenary curved portion of the lower chord 11 is provided with a substantially U-shape stirrup 17. The stirrup 17 is formed from a flanged bar or channel plate, as clearly shown in Figures 2 and 3, bent to provide a curvature similar to that of the lower chord 11 on which it loosely rests; while the intermediate portions at the upper ends of the stirrup are notched or cut out to receive the top chord 10 to which the ends are intimately secured or welded as shown at 18 in Figure 1. The bottom curved portion of the stirrup is provided with an opening to receive the upstanding annular rib or lug 19 which is shown welded at 20 to the bottom chord 11; the annular rib or lug 19 being made to extend through the opening in the stirrup and to extend a distance thereabove so as to extend through an opening in the spring plank 21 which is transversely dished or curved to fit the curvature of the stirrup and to rest loosely thereon. The spring plank 21, which is of channel cross-section, preferably is of width less than the distance between the upstanding side legs of the U-shape stirrup as shown in Figures 1 and 2. The ends of the spring plank 21 are shown provided with filler or spring seat members 22 provided with spring end holding bosses 23. The spring seat members 22 are made arcuate on the bottoms to fit the curvature of the spring plank 21 and the bottoms of the members 22 are socketed to loosely receive the upstanding lugs 19 secured to the bottom chords and extending through openings in the stirrup and in the spring plank so that a floating relation between the bottom chord, the stirrup and the spring plank is provided, while longitudinal movement of the spring plank is prevented by the upstanding lug 19, which also maintains the filler or spring seat member in place.

The inner sides of the two sides legs of the stirrup 17 are shown provided with load pads 24 which are suitably secured thereto which effect interlocking relation with the ends of the truck bolster (not shown) against longitudinal movement.

The upper ends of the stirrup 17 are also provided with suitable brake hanger brackets 25, which may be welded or otherwise suitably secured to the stirrup.

The type of journal box and load distributing plate heretofore described as illustrated in Figure 1 is clearly disclosed in Figure 4, where the bottom of the box is shown provided with a jack plate 26 and the outer end of the box is provided with a combination lid and wedge lug at 27; the jack plate 26, shown welded in place between the gussets 14, being preferably employed on boxes having the rounded bottoms shown in Figure 1.

Figure 5:
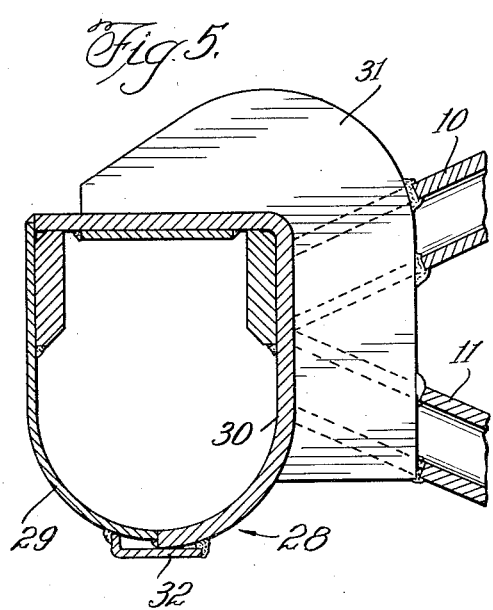
Figure 5 is a sectional view illustrating a modification or alternate form of journal box construction and load distributing member.

In Figure 5 I illustrate a modified manner of obtaining a sufficient load distributing juncture between the truss and the journal box. The chords 10 and 11 may be similar to those heretofore described, while the journal box 28 is shown formed of separately constructed sections 29, 30 of different thickness; the section 30 being materially heavier than section 29 and formed to constitute the top and the inner or chord attaching side of the box and is provided with gussets 31 (preferably three in number and spaced apart as shown in Figure 4) which extend transversely of the top and substantially throughout the inner side of the box. The gussets are welded to the box top and side and the ends of the chords 10 and 11 in turn are welded to the box section 30 and to the gussets 31.

In Figure 1, the load distributing plate is shown as a separate element which is welded to the box (which may be cast or pressed) whereas in Figure 5 the top, one side wall of the box and load plate in reality consist of a single unit.

With the box in Figure 5 having a rounded bottom and of unequal thickness, it is shown provided with a jack plate 32, welded or otherwise secured in place with one end or side edge of the plate which is disposed beneath the thinner wall section 29 provided with a lip or flange to compensate for the difference in thickness between the box wall sections.

Figure 6:
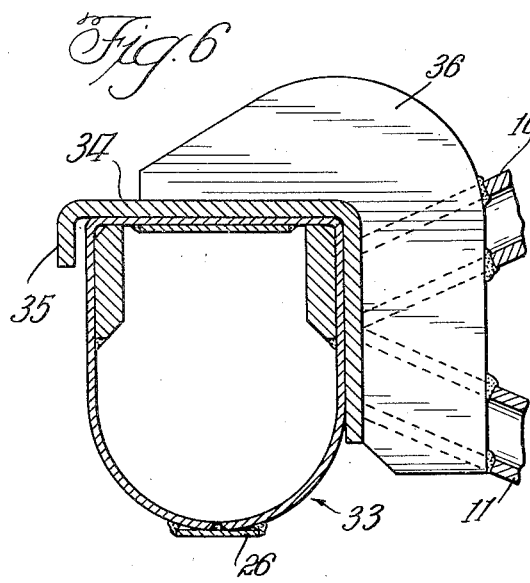
Figures 6 and 7 are similar views showing further modifications or designs of journal box constructions and distributing members.

Figure 6 shows a journal box 33 of substantially equal thickness throughout; the rounded bottom being provided with a jack plate 26 as shown in Figure 1. In this exemplification, the load distributing plate 34 differs from that shown in Figure 1 in that the plate extends entirely across and rests on top of the journal box 33 and is provided with a depending flange 35 somewhat removed from the outer side wall of the box. The vertical portion of the plate 34, similar to that shown in Figure 1, terminates at the inner side wall of the box somewhat above the bottom thereof; and the gussets 36 (preferably three in number as in Figure 4) are substantially similar to gusset 15 of Figure 1 and all intimately united with the chords 10 and 11 by welding. In view of the rounded bottom of the journal box it is also preferably provided with a flat jack plate 26.

Figure 7:
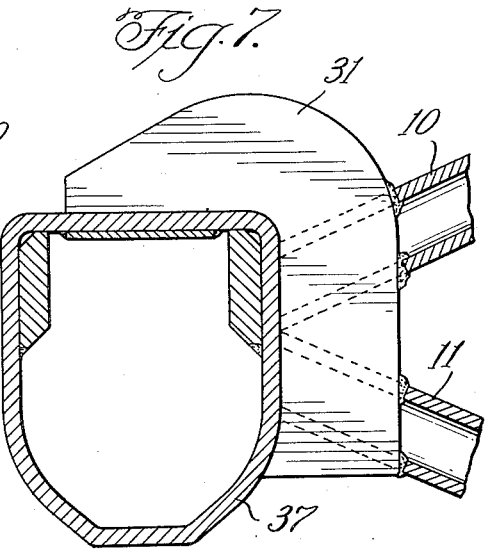

A further modification is shown in Figure 7 wherein the journal box 37 is formed with a uniformly heavy wall which, similar to Figure 5, is provided with gusset members 31 secured to the top and one side wall and preferably spaced to receive the slotted ends of the chords 10 and 11 which are welded thereto and therefore directly secured to the journal box, similar to the structure shown in Figure 5.

The journal box 37 is shown provided with a flat bottom and hence requires no separate jack plate.

My improved truss side frame possesses material advantages over present day type of side frames whose bottom chord has a flat stress member or horizontally disposed spring plank carrying section and with struts disposed through holes in the lower chord which consequently produces a weakness which frequently resulted in train wrecks, entailing great expense. The see-saw action encountered in unit trucks tends to shimmy the truck and the car and in trucks with the flat spring plank carrying section, the friction between the plank and the stress member tends to hold the spring plank in its shifted position; whereas with my improved side frame when the truck starts to shimmy, the floating spring plank is raised by following the catenary curve, absorbing energy and tending to keep the truck frames aligned and the two side frames square; and with the spring plank provided with the curvature of the bottom chord, to conform to the catenary curve, the load or weight is applied along the catenary curve as the spring plank and the stirrup have floating relation with the bottom chord.

The stirrup, as previously stated, preferably consists of a bowed channel plate or member which enables the use of a light stirrup with sufficient strength without necessitating raising the car too high or disposing the lower chord too low; the stirrup being free to float and having interlocking engagement which prevents longitudinal movement of the spring plank—a frame in which the flexes or stresses are eliminated because of the floating relation between bottom chord, the stirrup and the spring plank, while the curved spring plank tends to check the longitudinal vibration or sawing action of the two truck frames.

The truss members are preferably of the cross sectional configuration shown, but the entire side frame could be a cast structure, of different cross-section, with a separate stirrup in floating relation with the bottom deflection curve or the curve which the stress member assumes under a load; and while the exemplifications are believed to be the best embodiments of the invention, structural modifications are possible and may be made without, however, departing from the spirit of my invention as expressed in the appended claims.

What I claim is:

1. A car truck side frame comprising, in combination with journal boxes at the ends, a tubular top chord and bottom chord, the intermediate portion of the bottom chord defining a catenary curve, angular load distributing plates adapted to extend across the tops and downwardly at the sides of the journal boxes and provided with radially disposed gussets arranged at opposite sides of the plates, said plates and gussets being intimately secured to the ends of the chords at the sides of the journal boxes, a U-shape stirrup intermediate the two chords with its ends secured to the top chord while the curved lower portion approximates the catenary curve of the bottom chord and loosely rests thereon, a transversely curved spring plank loosely seated in the curved portion of the stirrup and in spaced relation with the sides of the stirrup, a spring seat member with an arcuate bottom seated in the curved spring plank, and an upstanding lug secured to the bottom chord and disposed through the stirrup, the spring plank and into the spring seat member whereby a loose holding relation between said elements is provided.

2. A car truck side frame comprising, in combination with a pair of journal boxes, a truss forming top chord and a bottom chord of steel tubing, the top chord having a substantial horizontal intermediate portion with ends sloping downwardly toward the sides of the journal boxes, while the bottom chord at its intermediate portion defines a catenary curve and the ends slope upwardly toward the sides of the journal boxes the ends of both chords being arranged in juxtaposition at the sides of the journal boxes and welded to the journal box sides intermediate the tops and bottoms of said boxes; load distributing plates secured to the ends of both chords and to the sides of the journal boxes and arranged to extend across the tops of the journal boxes; vertically disposed gusset members welded to the tops and sides of the distributing plates in overlapping relation with the sides of both chords and welded thereto; and a U-shape stirrup disposed between the top chord and the curved portion of the bottom chord, with the ends of the stirrup intimately secured to the top chord while the curved portion of the stirrup loosely rests on the curved portion of the bottom chord.

3. A car truck side frame comprising, in combination with a pair of journal boxes, a truss forming top chord and a bottom chord of steel tubing, the ends of the two chords being arranged in juxtaposition at the sides of the journal boxes; angular load distributing plates secured to the ends of the chords and to the sides of the journal boxes with the angular portion disposed across the tops of the journal boxes and secured thereto, said plates being provided with a plurality of gussets overlapping the sides of the chords and intimately secured thereto.

4. A car truck side frame comprising, in combination with a pair of journal boxes, a truss forming top chord and a bottom chord of steel tubing, with the ends of the chords arranged in juxtaposition adjacent the sides of the journal boxes and intimately secured thereto, the bottom chord being formed to define a catenary curve; a single piece stirrup whose lower end defines the curvature of the bottom chord, the upper ends of the stirrup being intimately united with the top chord while the bottom of the stirrup rests loosely on the curved portion of the bottom chord; and a transversely curved spring plank loosely mounted on the curved bottom of the stirrup with its sides spaced from the sides of the stirrup.

5. A car truck side frame comprising, in combination with a pair of journal boxes, a truss forming top chord and a bottom chord of steel tubing, the ends of the chords being bent toward each other and arranged in juxtaposition at the sides of the journal boxes intermediate the tops and bottoms thereof, the ends of the chords being slotted; a plurality of gussets intimately secured to the sides and to the tops of the journal boxes with certain of the gussets arranged at opposite sides of the chords and intimately secured thereto, while the intermediate gussets extend into the slots of the chords and are intimately secured in place; and a single piece U-shape stirrup whose upper ends are intimately secured to the top chord while the bottom rests loosely on the bottom chord.

6. A car truck side frame with journal boxes at the ends comprising top and bottom tubular chords with the intermediate portion of the bottom chord defining a deflection curve, the ends of the chords being arranged in contact with each other at the sides of the journal boxes intermediate the tops and bottoms thereof; spaced gusset members formed to fit the sides and tops of the journal boxes and to overlap the sides of the chords, said members being intimately secured to the chords and to the adjacent sides and tops of the journal boxes; and a U-shape stirrup whose curvature corresponds to the deflection curve of the lower chord and loosely rests thereon, the side edges of the stirrup having outwardly disposed flanges arranged in overlapping relation with opposite sides of the bottom chord, while the upper ends of the stirrup are socketed to receive the top chord and are intimately secured thereto.

7. A car truck truss side frame with journal boxes at the ends, comprising arched top and bottom tubular chords with the bottom chord defining a deflection curve and provided with an upstanding lug, the ends of the chords being arranged in juxtaposition against the sides of the journal boxes intermediate the tops and bottoms thereof, gusset members formed to extend across the tops and throughout the sides of the journal boxes in overlapping relation with the ends of the chords and intimately secured to the journal boxes and to the chords; a U-shape stirrup whose ends are rigidly secured to the top chord while the curved lower portion of the stirrup corresponds to the curvature of the bottom chord and loosely rests thereon, the curved portion being provided with an opening to receive said lug; and a spring plank transversely curved to correspond to the curvature of the stirrup and loosely mounted therein with the sides of the plank spaced from the sides of the stirrup and the ends of the plank provided with openings to receive the lug of the bottom chord, whereby the plank is held against lateral displacement.

8. A car truck side frame with journal boxes at the ends comprising top and bottom tubular chords with the intermediate portion of the bottom chord defining a deflection curve, the ends of the chords being arranged in contact with each other at the sides of the journal boxes; spaced gusset members formed to extend about the tops and sides of the journal boxes and to overlap the sides of the chords and intimately secured to the chords and to the tops and sides of the journal boxes; a U-shape stirrup whose curvature corresponds to the deflection curve of the bottom chord and loosely rests thereon, the upper ends of the stirrup being welded to the top chord, and a vertically disposed lug-and-socket connection between the curved portions of the bottom chord and the stirrup.

KARL F. NYSTROM.